April 16, 1957
J. MERCIER
2,789,176
PRESSURE SWITCH
Filed April 26, 1954
3 Sheets-Sheet 1
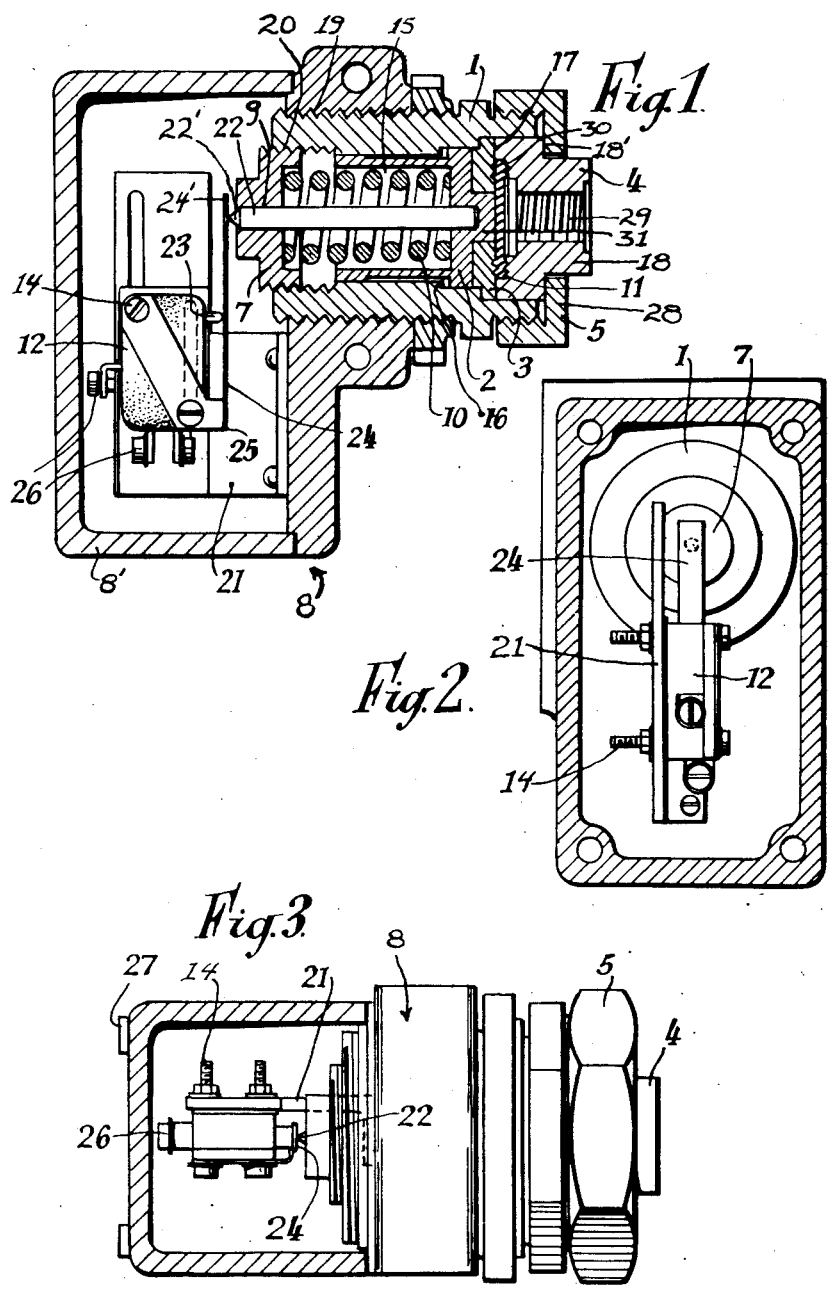
INVENTOR
JEAN MERCIER
BY
ATTORNEYS April 16, 1957  J. MERCIER  2,789,176
PRESSURE SWITCH Filed April 26, 1954  3 Sheets-Sheet 2

INVENTOR
JEAN MERCIER
BY
ATTORNEYS

April 16, 1957　　　　J. MERCIER　　　　2,789,176
PRESSURE SWITCH

Filed April 26, 1954　　　　　　　　　　　3 Sheets-Sheet 3

INVENTOR
JEAN MERCIER
BY
ATTORNEYS

United States Patent Office 2,789,176
Patented Apr. 16, 1957

2,789,176

PRESSURE SWITCH

Jean Mercier, New York, N. Y.

Application April 26, 1954, Serial No. 425,566

Claims priority, application Great Britain April 27, 1953

15 Claims. (Cl. 200—83)

This invention relates to pressure switches, more particularly of the type which includes a micro-switch controlling an electrically operated device, which operates a pump or valve to determine the pressure applied to the switch.

As conducive to an understanding of the invention, it is noted that where a micro-switch is connected, for example, to an electric motor controlling a pump which determines the pressure in a fluid line and such micro-switch is controlled by the pressure in such line, where such micro-switch requires a predetermined force for actuation and a considerably lesser force to retain it actuated, there will be a relatively great differential between the predetermined line pressure required initially to actuate the micro-switch, and a reduced line pressure which is sufficiently low to permit the switch to be de-actuated and consequently the pressure in the line cannot be maintained within relatively narrow limits.

It is accordingly among the objects of the invention to provide a pressure switch which includes a conventional micro-switch which requires a predetermined force for actuation and a considerably lesser force to retain it actuated, yet which will permit actuation and cut off of said micro-switch within relatively narrow limits of pressure and which may readily be adjusted to vary precisely the limits of actuation and cut off, which pressure switch is neat, compact and may readily be fabricated from relatively inexpensive materials and is not likely to become deranged even with long continued use.

According to the invention, these objects are accomplished by the arrangement and combination of elements hereinafter described and particularly recited in the claims.

Figure 4:
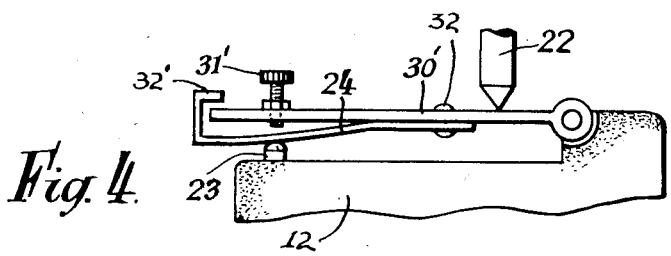
Figure 5:
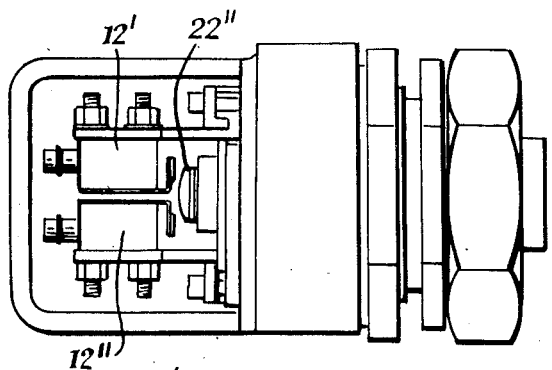
Figure 6:
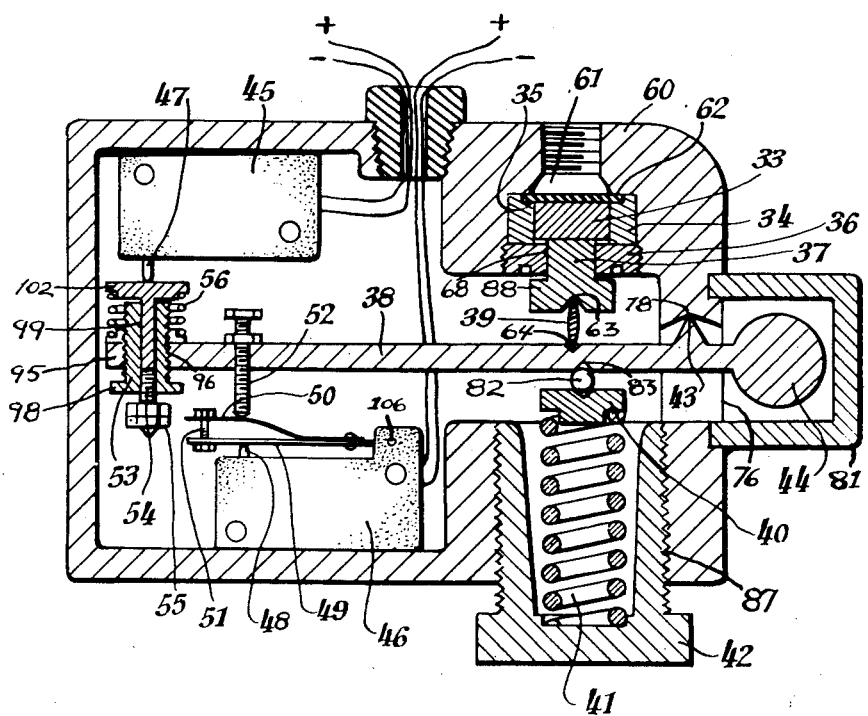

In the accompanying drawings in which are shown one or more of various possible embodiments of the several features of the invention, Fig. 1 is a longitudinal cross sectional view of one embodiment of the pressure switch, Fig. 2 is an end view thereof taken from the left side of Fig. 1 with the cover removed, Fig. 3 is a top plan view of the switch also with the cover removed, Fig. 4 is a fragmentary detail view of a modification of the switch shown in Figs. 1 to 3, Fig. 5 is a top plan view of another embodiment of the switch, and Fig. 6 is a view similar to Fig. 1 of still another embodiment of the pressure switch.

This application is a continuation-in-part of copending application Serial No. 298,503, filed July 12, 1952.

Referring now to Fig. 1 of the drawings, the pressure switch desirably comprises a casing 8 in which a micro-switch 12 is mounted, a cover 8' being affixed to the casing by suitable screws 27. As is clearly shown, the micro-switch is supported on a bracket 21 in such manner that it may be moved therealong and may be retained in any fixed position of adjustment by means of screws 14. The micro-switch 12 is of conventional type having a movable control member or actuating pin 23 normally urged outwardly by means of a coil spring (not shown). Associated with the pin 23 is a leaf spring 24, affixed at one end as at 25 to the body of the micro-switch and extending longitudinally of the latter past the pin 23 and resting thereagainst.

The body 8 has an opening 19 leading thereinto which is desirably internally threaded. Screwed into said opening is a hollow plug 1 which is internally threaded at its inner end as at 20 so that a plug 7 having an axial bore 9 may be retained therein. Slidably mounted in the bore 15 of the plug 1 is a piston 2, the movement of which is limited by an annular shoulder 16 in said plug and by a washer 3 retained against a second annular shoulder 17 in plug 1 by means of an end plug 4. The end plug 4, as shown in Fig. 1, has a reduced diameter outer portion 18 defining an annular shoulder 18' and a cap 5 screwed on the outer end of the plug 1 has an annular flange 28 which urges the washer 3 against annular shoulder 17 to retain the latter in position.

The end plug 4 has an axial bore 29 therethrough of enlarged diameter at its inner end as at 30 and a resilient diaphragm 11 is positioned in such enlarged diameter portion, being retained in position by the clamping action of washer 3 and end plug 4. The piston 2 has a reduced diameter axial portion 31 which extends through a corresponding opening in the washer 3 so that the diaphragm 11 may react thereagainst when pressure is applied to axial bore 29 of the end plug 4.

The piston 2 is normally retained in seated position against the washer 3 by means of a coil spring 10 compressed between said piston 2 and the adjacent surface of plug 7, and which encompasses a plunger 22 affixed at one end to the piston and extending axially therefrom through the opening 9 in plug 7, the outer end 22' of the plunger engaging the free end 24' of the leaf spring 24.

Although the micro-switch, above described, may have any suitable characteristics, in the embodiment herein shown, to illustrate the invention, it is desirably of the type that requires a force of 20 ounces to overcome the resilient means (not shown) associated with the pin 23 for actuation and four ounces to retain the pin 23 in actuated position.

With the bore 29 or fluid inlet of the pressure switch connected, for example, to a line through which fluid is being forced under pressure, created by a pump driven by an electric motor, if it is desired to stop the motor if the pressure in the line rises above say 2,000 p. s. i., and to start the motor if the pressure falls below say 1,950 p. s. i., the tension on spring 10 is adjusted by rotating end plug 7 until a pressure of 1,950 p. s. i. or more against diaphragm 11 would initially move the piston 2. The leaf spring 24 is selected so that it has a resiliency such that when its free end 24' is first deflected by movement of the plunger 22, with movement of the piston 2, it will not cause the pin 23 of the micro-switch to move inwardly sufficiently to actuate the latter. Only when the pressure in the line has risen to 2,000 p. s. i. will the free end 24' of the leaf spring have been deflected sufficiently to the left so that it exerts sufficient force against the pin 23 to move the latter inwardly to actuated condition, overcoming the counter force of 20 ounces normally urging the pin 23 outwardly. At such time, the leaf spring 24 which has been bowed over pin 23 by the force exerted by plunger 22 will substantially straighten out and the force exerted thereby would fall. By reason of the inherent stiffness of such leaf spring, and the fact that it is still slightly bowed, it will retain the pin 23 in actuated position against the counter force of four ounces tending to move it to de-actuated position.

It is of course to be noted that by changing the characteristics of the leaf spring, i. e., if it is a softer spring, more deflection of the free end 24' will be required before the pin 23 is moved sufficiently to actuate the micro-switch and hence greater line pressure would be required. Such result can also be accomplished by moving the micro-switch along its mount to increase the distance between the pin 23 and the point of application of the plunger 22 against the leaf spring or by moving the plug 1 toward the leaf spring 24.

It is of course to be noted that the limits of the spring characteristics and the position of the micro-switch and the plug 1 are determined by the possible range of movement of the piston, which, of course, is limited by the annular shoulder 16 and the washer 3.

When the micro-switch 12 is actuated, the motor driving the pump will be cut off and the pressure on the fluid forced into bore 29 will gradually fall.

When the pressure drops to say 1,950 p. s. i., the main coil spring 10 will move the piston to the right and the free end of the leaf spring will follow the end of the plunger. However, as the leaf spring is still slightly bowed, it will still retain the pin of the micro-switch pushed inwardly so that the latter will remain actuated. When the pressure drops to slightly below 1,950, say 1,949 p. s. i., at such time the leaf spring will be back to its original position and consequently the pin of the micro-switch will be released so that the latter can again close to actuate the pump motor.

As the stroke of the pin of the micro-switch between its two operating positions is constant, and as the deflection of the leaf spring between such two positions can be dependably set, it is apparent that the micro-switch will operate at the precise pressure desired.

In the embodiment of the invention shown in Fig. 4, which is similar to that shown in Figs. 1 to 3, the rod 22, movable with the piston, bears against a pivoted lever 30' associated with the leaf spring 24, the arrangement being preferably such that the movement of the rod 22 is less than the movement of the screw 31' or other element on the lever which actuates the pin 23 of the micro-switch 12. The leverage may be altered according to requirements.

One end of the leaf spring 24 is fixed to the lever 30' at 32 and a part of the spring which is movable relatively to the lever extends between the screw 31' and the pin 23. When the pressure in the line moves rod 22 sufficiently, the leaf spring 24 is compressed so that the screw 31' moves the pin 23 positively through the spring. When the rod 22 is retracted, due to a decrease in the pressure in the line, the lever 30' moves away from the pin 23, but the leaf spring 24 remains in contact therewith and the force exerted by it is at first sufficient to maintain the pin in the position to which it has been previously actuated. Further movement of the rod 22 either results in a decrease of the force exerted by the leaf spring 24 so that the pin 23 returns to its inoperative position, or the leaf spring 24, is positively withdrawn by the lever. This positive withdrawal may be effected by a connection between the free end of the intermediate spring and the lever, the connection being adapted to limit their relative movement. For example, the free end of the intermediate spring may be bent through two right angles so that one end 32' extends over the free end of lever 30'. In this way positive operation of the pin 23 is obtained with a high degree of precision in relation to the pressure in the line. This precision as mentioned previously, applies both to the actuation and to the de-actuation each independently of the other. It will be understood that the rate of the leaf spring may be calculated to take into account the difference of pressure to be exerted on the pin 23 for actuation and for cut off of the micro-switch so that the pressure of actuation and of de-actuation can each be maintained within narrow limits.

In the embodiment shown in Fig. 5, which is also similar to that shown in Figs. 1 to 3, the rod 22" acts upon two micro-switches 12', 12" in succession. The two micro-switches are fixed a very short distance apart, so that, for a predetermined lower pressure, the first switch is actuated and, for a predetermined higher pressure, the second switch is actuated. A suitably conventional electric circuit is associated with the switches in order to obtain (a) actuation by one switch to the "on" position in response to the attainment of a predetermined lower pressure whereby the pump becomes operative, and (b) actuation by the second switch to the "off" position in response to the attainment of a predetermined higher pressure whereby the pump is rendered inoperative.

In accordance with another embodiment of the invention (not shown), two pressure switches are connected in parallel to the pressure line or conduit, each having its independent piston, rod and resilient means. The strengths of the resilient means in the two cases differ and are so calculated that the weaker resilient means corresponds to the predetermined actuation pressure in the line so that the corresponding rod adjusts the switch to the "on" position, and the stronger resilient means corresponding to the higher predetermined pressure in the line brings about adjustment to actuate the switch to the "off" position.

The embodiment shown in Fig. 6 comprises a casing 60 having a port 61 for application of fluid under pressure. The port 61 is of enlarged diameter at its inner end defining a shoulder 62 against which a flexible diaphragm 35 is positioned. The diaphragm is retained against the shoulder 62 by means of a ring 34 which is retained in the port by means of a screw 36 having an axial bore 68 therethrough. Slidably mounted in the ring between the diaphragm 35 and the screw 36 is a piston 33 which reacts against a follower 37 slidably mounted in the bore 68 of the screw 36 and extending from the latter. The follower 37 reacts against a knife blade 39 seated at its ends in opposed grooves 63, 64 in the follower 37 and in a lever arm 38 which, as shown in Fig. 2, is positioned in the casing 60 and extends at one end through an opening 76 therein.

The lever 38 has a suitable pivot conformation, desirably a knife edge 43 which seats against a corresponding recess 78 in the opening 76 of the casing, and the end of the lever extending through opening 76 desirably is conformed as a counterweight 44 which renders the micro-switches insensitive to vibration and which is covered by means of a cage 81 affixed to the outer wall of the casing. The lever 38 is supported by means of a ball 82 resting in a depression 83 in the undersurface of the lever 38, to the right of groove 64 and seated on a follower 40 which is resiliently urged toward the lever by means of a coil spring 41 positioned in the bore of a plug 42 screwed into a threaded opening 87 in the wall of the casing.

To prevent injury to the diaphragm 35, the piston 33 has its movement limited in both directions. Thus, the downward movement of the piston is limited by the screw 36 and its upward movement is limited by the annular flange 88 of follower 37.

The lever 38 is designed to actuate a plurality of micro-switches 45 and 46 of conventional type. These micro-switches are mounted respectively on opposed walls of the casing straddling lever 38 and each has a pin 47, 48 for actuation thereof.

The lever 38 at its free end 95 has a threaded opening 96 through which extends a hollow screw 53, the latter having a head 98 at one end. Slidably mounted in the bore 99 of the screw 53 is a pin 54 having a head 102 at its upper end. The pin 54 is normally urged upwardly by means of a coil spring 56 which encompasses the screw 53 and reacts against the end of the lever 38 and the head 102 of the pin. The spring 56 is designed to exert a force less than that required to actuate the micro-switch 45, but greater than that required to retain it actuated. The upward movement of the pin is limited by nuts 55, screwed on the threaded end of said pin and the downward movement of the pin 54 is limited by the abutment of the head 102 against the end of the screw 53. As shown in Fig. 6, the head 102 is designed to react against the pin 47 of micro-switch 45 in the manner hereinafter to be described.

The micro-switch 46 is equipped with a small lever 49 pivoted at one end as at 106 and contacting the pin 48. Affixed on lever 49 is a leaf spring 50, the movement of which is limited by a screw 51 and which is normally retained against the free end of a screw 52 extending through lever 38.

When the fluid pressure acting against the diaphragm 35 and piston 33 exceeds the maximum limit, lever 38 will turn about its pivot 43 against the tension of spring 41 so that the screw 52 compresses leaf spring 50 and positively moves lever 49 against pin 48 of micro-switch 46 to actuate the latter. When the fluid pressure decreases so that screw 52 is withdrawn allowing leaf spring 50 to expand upwardly, the leaf spring 50 will retain the pin 48 of micro-switch 46 in operative position until the spring 50 reaches the end of its range of movement as determined by screw 51, at which time the lever 49 is free to rise.

If the fluid pressure continues to decrease and attains the minimum predetermined value, the lever 38 will pivot in such manner that when the head of pin 54 abuts against the adjacent end of screw 53 and spring 56 is compressed, the pin 47 of micro-switch 45 will be moved inwardly to actuate said micro-switch.

When the fluid pressure increases and the free end of lever 38 is moved downwardly, spring 56 will urge pin 54 upwardly to retain the pin 47 of micro-switch 45 in actuated position until the nuts 55 engage the head 98 of screw 53 at which time the pin 47 will be released to deactuate the micro-switch 45.

As the result of the arrangement above described, a high degree of precision is attained at both the maximum and minimum values. This precision is attained for several reasons. Thus, the change over from one micro-switch to the other takes place when the fluid pressure is in an intermediate range between, but clear of the maximum and minimum predetermined operating pressures. Furthermore, a factor causing lack of precision which may be introduced by reason of the location of the micro-switches at different positions along the length of the lever 38 is neutralized by making the distances separating the pivot 43 from the points of application of the blade 39 and spring 41 in the same ratio as the distances separating the pivot 43 from the points of application of force to the pins 47 and 48 of the micro-switches.

Furthermore, due to the multiplying factor provided in the lever mechanism of the pressure switch shown in Fig. 6, it is possible to obtain a differential range between the minimum and maximum operating pressures as large as may be desired for a minimum displacement of the piston thereby ensuring long life of the diaphragm.

With the pressure switches above described, long life is assured as well as dependable operation at precise desired minimum and maximum operating pressures.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure switch of the character described comprising a micro-switch having a movable control member, a piston movable in two directions reacting against said control member, a flexible diaphragm reacting against the piston on one side and adapted to be subjected to a source of fluid under pressure on its other side, means to provide a fluid seal between the source of fluid under pressure and the piston and means to limit the movement of said piston, in both directions, a spring operatively connected between the piston and the movable control member of the micro-switch, said spring being designed to exert a maximum force less than that required to actuate the control member of the micro-switch, but greater than that required to retain the control member in actuated position and means to limit the movement of the spring in both directions.

2. The combination recited in claim 1 in which a movable member is operatively connected to the piston and the control member of the micro-switch and resilient means are associated with said movable member to oppose the movement of the piston.

3. The combination recited in claim 2 in which means are provided to regulate the force exerted by said resilient means.

4. A pressure switch of the character described comprising a casing, a micro-switch in said casing, said micro-switch having a movable control member, a resilient leaf affixed at one end and adapted to abut against the control member of the micro-switch, a piston movable in two directions slidably mounted in said casing, means to limit the movement of the piston in both directions, a plunger affixed at one end to said piston and having its other end adapted to abut against the free end of said leaf, a spring reacting against said piston and normally urging the latter against one of said limiting means, said casing having a fluid inlet port, a flexible diaphragm affixed in said fluid inlet port, one side of said diaphragm reacting against said piston and the fluid under pressure being adapted to react against the other side of said diaphragm, an arm pivotally mounted at one end with respect to said micro-switch, said resilient leaf being affixed at one end to said arm between the arm and the control member, adjustable means carried by said arm near its free end to react with said leaf spring and means to limit the movement of the free end of said leaf spring.

5. A pressure switch of the character described comprising a casing, a micro-switch in said casing, said micro-switch having a movable control member, a resilient leaf affixed at one end and adapted to abut against the control member of the micro-swtich, a piston movable in two directions slidably mounted in said casing, means to limit the movement of the piston in both directions, a plunger affixed at one end to said piston and having its other end adapted to abut against the free end of said leaf, a spring reacting against said piston and normally urging the latter against one of said limiting means, said casing having a fluid inlet port, a flexible diaphragm reacting against said piston and the fluid under pressure being adapted to react against the other side of said diaphragm, an arm pivotally mounted at one end with respect to said micro-switch, said resilient leaf being affixed at one end to said arm between the arm and said control member, adjustable means carried by said arm near its free end to react with said leaf spring, the free end of the leaf spring being reversely bent and extending over the free end of said arm to limit the movement of said free end.

6. The combination recited in claim 4 in which means are provided to adjust the force exerted by the spring associated with said piston.

7. The combination recited in claim 4 in which said casing has a bracket therein and said micro-switch is slidably mounted on said bracket movable at right angles to said plunger to vary the distance between the point of abutment of said plunger against said leaf and the point of abutment of said leaf against control member of said micro-switch.

8. A pressure switch of the character described comprising a casing, a pair of micro-switches in said casing, said micro-switches each having a movable control member, a pair of resilient leaves affixed at one end and extending past the control member of the associated micro-switch and adapted to abut thereagainst, a piston movable in two directions slidably mounted in said casing, means to limit the movement of the piston in both directions, a plunger affixed at one end to said piston and having its other end adapted to abut against the free ends of both of said leaves successively to actuate said micro-switches, one of said switches being actuated at a predetermined pressure to effect one circuit operation and the other of said switches being actuated at a predetermined higher pressure to effect an opposed circuit operation, a spring reacting against said piston and normally urging the latter against one of said limiting means, said casing having a fluid inlet port, a flexible diaphragm affixed in said fluid inlet port, one side of said diaphragm reacting against said piston and the fluid under pressure being adapted to react against the other side of said diaphragm.

9. A pressure switch of the character described comprising a casing having a fluid inlet port, a slidably mounted piston movable in two directions, a flexible diaphragm interposed between said piston and said fluid inlet port, a lever pivotally mounted near one end in said casing, means to limit the movement of said piston in both directions, means to apply force from said piston said said lever on one side thereof, resilient means reacting against said lever to resist the force applied by said piston, a pair of micro-switches in said casing mounted on opposed sides of said lever, each of said micro-switches having a movable control member and adjustable resilient means associated respectively with each of said micro-switches and operatively connected between said lever and the movable control member of the associated micro-switch.

10. The combination recited in claim 9 in which the resilient means reacting against said lever is on the side thereof opposed to the piston and is adjacent the means to apply force to the lever.

11. The combination recited in claim 9 in which one of said micro-switches mounts a lever arm adapted to abut against the associated control member, a leaf spring is mounted on said lever arm, means are provided to limit the movement of said leaf spring with respect to said lever arm and said lever carries a member adapted to abut against said leaf spring.

12. The combination set forth in claim 11 in which the means carried by the lever is an adjustment screw.

13. The combination recited in claim 9 in which said lever has a hollow screw threaded therethrough, a pin is slidably mounted in said hollow screw, resilient means associated with said pin normally urge the latter toward the control member of the associated micro-switch, and means to limit the movement of said pin in both directions.

14. The combination recited in claim 9 in which one of said micro-switches mounts a lever arm adapted to abut against the associated control member, a leaf spring is mounted on said lever arm, means are provided to limit the movement of said leaf spring with respect to said lever arm, said lever carries a member adapted to abut against said leaf spring, said lever has a hollow screw threaded therethrough, a pin is slidably mounted in said hollow screw, resilient means associated with said pin normally urge the latter toward the control member of the associated micro-switch, and means to limit the movement of said pin in both directions.

15. The combination recited in claim 9 in which the lever has a counterweight adjacent the pivoted end thereof.

References Cited in the file of this patent

UNITED STATES PATENTS

| | | |
|---|---|---|
| 814,277 | Craft | Mar. 6, 1906 |
| 2,338,365 | Thorpe et al. | Jan. 4, 1944 |
| 2,357,878 | Crews | Sept. 12, 1944 |
| 2,404,843 | Huber | July 30, 1946 |
| 2,475,069 | Wood | July 5, 1949 |
| 2,500,457 | Hess | Mar. 14, 1950 |
| 2,547,765 | Lund | Apr. 3, 1951 |
| 2,612,368 | Ransome | Sept. 30, 1952 |
| 2,615,102 | McMath | Oct. 21, 1952 |